United States Patent [19]

Coon et al.

[11] 4,443,308
[45] Apr. 17, 1984

[54] METHOD AND APPARATUS FOR SYNTHESIZING ANHYDROUS HNO₃

[75] Inventors: Clifford L. Coon, Fremont; Jackson E. Harrar, Castro Valley; Richard K. Pearson, Pleasanton; Raymond R. McGuire, Brentwood, all of Calif.

[73] Assignee: The United States of America as represented by United States Department of Energy, Washington, D.C.

[21] Appl. No.: 399,946

[22] Filed: Jul. 20, 1982

[51] Int. Cl.³ .......................... C25B 1/00; C25B 9/04
[52] U.S. Cl. .................................. 204/103; 204/101; 204/262; 204/268
[58] Field of Search ............... 204/101, 103, 129, 130, 204/262, 228

[56] References Cited

U.S. PATENT DOCUMENTS

| | | | |
|---|---|---|---|
| 887,266 | 5/1908 | Paüling | 204/130 |
| 1,008,383 | 11/1911 | Sparre | 204/262 |
| 3,926,953 | 12/1975 | Coburn et al. | 260/239 BC |
| 4,289,591 | 9/1981 | Davidson et al. | 204/129 |

FOREIGN PATENT DOCUMENTS 231546  2/1911  Fed. Rep. of Germany ...... 204/130

OTHER PUBLICATIONS

"Electrochem. Prep. of $N_2O_5$" by J. Zawadski et al., Roczniki Chemii 22, (1948), pp. 233-247.

Primary Examiner—R. L. Andrews
Attorney, Agent, or Firm—Paul Davis; Shyamala Rajender; Michael F. Esposito

[57] ABSTRACT

A method and apparatus for electrochemically synthesizing anhydrous $HNO_3$ from an aqueous solution of $HNO_3$ includes oxidizing a solution of $N_2O_4$/aqueous $HNO_3$ at an anode, while maintaining a controlled potential between the $N_2O_4$/aqueous $HNO_3$ solution and the anode. A potential of about 1.80V vs. SCE is preferred. Anhydrous or aqueous $HNO_3$ may be disposed at the cathode within the electrochemical cell. Aqueous $HNO_3$ having a water content of up to about 12% by weight is utilized to synthesize anhydrous $HNO_3$.

15 Claims, 2 Drawing Figures

METHOD AND APPARATUS FOR SYNTHESIZING ANHYDROUS HNO₃

BACKGROUND OF THE INVENTION

The United States Government has rights in this invention pursuant to Contract No. W-7405-ENG-48 between the U.S. Department of Energy and the University of California, for the operation of Lawrence Livermore National Laboratory.

The present invention relates generally to a method and apparatus for synthesizing anhydrous HNO₃, and more particularly to a method and apparatus for synthesizing anhydrous HNO₃ electrochemically, utilizing a controlled potential applied between the anode and the solution disposed at the anode. The subject matter disclosed and claimed herein relates to the subject matter disclosed and claimed in our copending patent application, DOE Docket No. S-58,120 (RL-8617).

Nitric acid has become a major industrial chemical, particularly in relation to the fertilizer and explosives industries. The largest use of nitric acid has been in the production of ammonium nitrate for use as fertilizer. Initially such use was in the form of solid aluminum nitrate granules, i.e. prills, but increasing quantities have been mixed with excess ammonia and/or urea and shipped as aqueous nitrogen solutions for direct applications to the soil for the manufacture of mixed fertilizer. In the mid-1950's, the use of ammonium nitrate prills mixed with fuel oil was accepted for direct use as an explosive.

Additionally, nitric acid is used in the manufacture of cyclohexanon, the raw material for adipic acid (qV) and caprolactam, which are monomers used in producing nylon. Recently, from 5-10% of nitric acid production has gone into this use. Approximately 5-10% is also used in a large number of other organic syntheses; the most rapidly growing is toluene diisocyanate (TDI) which is used for polyurethane production.

Aqueous nitric acid is produced by a standard ammonia oxidation process at a concentration of about 50-70 wt %. In this process, ammonia is oxidized with excess of oxygen over a catalyst to form nitric oxide and water, as shown by the following equation:

$$4NH_3 + 5O_2 \rightarrow 4NO + 6H_2O \qquad (1)$$

The nitric oxide is then oxidized to the dioxide, and with the absorption of nitrogen oxides in water, nitric acid and additional nitric oxide are produced. A nitric oxide concentration of about 50-70% is suitable for the production of ammonium nitrate, but for use in organic nitrations, anhydrous nitric acid is required. Since nitric acid forms an azeotrope with water at 68.8 wt %, the water cannot be separated from the acid by simple distillation.

Anhydrous nitric acid, e.g. 98 to 99 wt % nitric acid, has been synthesized by a process which involves distillation of weak nitric acid with concentrated sulfuric acid, the latter serving as a dehydrating agent. Typically, 60 wt % nitric acid is mixed with 93 wt % sulfuric acid in a packed tower which is provided with a steam-heated re-boiler. The nitric acid vapor is distilled and condensed, and the sulfuric acid and water leave the bottom as ca 70 wt % $H_2SO_4$. Water is then removed from the sulfuric acid in a sulfuric acid concentrator, and the 93 wt % of $H_2SO_4$ is recycled in the process.

An alternative extraction medium is a 72 wt % solution of magnesium nitrate in water. The nitrate solution typically leaves the distillation column at ca 68 wt %, and is re-concentrated by flashing to a steam-heated vacuum drum.

These methods for producing anhydrous nitric acid require the recycling of large quantities of sulfuric acid. This inherently presents the potential of major catastrophic accidents, as well as the production of large quantities of waste heat. Thus from a cost standpoint, they are inherently deficient. Additionally, much energy is wasted.

SUMMARY OF THE INVENTION

Accordingly, an object of the invention is to provide a method and apparatus for synthesizing anhydrous HNO₃ from aqueous HNO₃ without recycling large quantities of sulfuric acid.

Another object of the invention is to provide a method and apparatus for synthesizing anhydrous HNO₃ from aqueous HNO₃ without dissipating large quantities of heat.

Yet another object of the invention is to provide a method and apparatus for synthesizing anhydrous HNO₃ from aqueous HNO₃ with a minimal expenditure of energy.

Still a further object of the invention is to provide a method and apparatus for synthesizing anhydrous HNO₃ from aqueous HNO₃ by electrochemical means.

Yet another object of the invention is to provide a method and apparatus for electrochemically synthesizing anhydrous HNO₃ from aqueous HNO₃, while minimizing side reactions in the electrochemical cell.

Additional objects, advantages and novel features of the invention will be set forth in part in the description which follows, and in part will become apparent to those skilled in the art by examination of the following, or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as embodied and broadly described herein, a method of dehydrating aqueous HNO₃ comprises providing an electrochemical cell which includes an anode disposed in an anode compartment of a cell, and a cathode disposed in a cathode compartment. The anode and cathode are operatively connected to a power source. A solution of anhydrous HNO₃ is disposed in the cathode compartment and a solution of $N_2O_4$/aqueous HNO₃ in the anode compartment. A controlled potential is applied and maintained between the solution in the anode compartment and the anode, resulting in the formation of $N_2O_5$ and anhydrous HNO₃ within the anode compartment. In a further aspect of the method of the invention, the controlled potential applied between the anode and the solution disposed within the anode compartment is about 1.35 to 2.00 V vs. SCE (saturated calomel electrode). More particularly, the controlled potential is about 1.80 V vs SCE.

In yet a further aspect of the present invention, and in accordance with its objects and purposes, the apparatus for electrochemically synthesizing anhydrous HNO₃ from a solution of aqueous HNO₃ comprises means for housing a solution of $N_2O_4$ and a solution of aqueous HNO₃. Also included is a power source. An anode is disposed in an anode compartment of the housing means, and the anode is operatively connected to the $N_2O_4$ and aqueous $HNO_3$ solutions, and also to the power source. A cathode is disposed in a cathode compartment of the housing means, and is operatively connected to the power source. The cathode compartment houses a solution of aqueous $HNO_3$. Means are included for maintaining a controlled potential between the $N_2O_4$ and aqueous $HNO_3$ solution disposed in the anode compartment and the anode.

Use of electrochemical means to synthesize anhydrous $HNO_3$ from a solution of aqueous $HNO_3$ eliminates the need for large quantities of $H_2SO_4$. Accident potentials inherent in using such large quantities of acid are thus minimized. Additionally, the method and apparatus of the present invention, through the application of a controlled potential, minimizes the energy requirement for the synthesis. In particular, loss of large quantities of heat inherent with recycling $H_2SO_4$, as recited in previous methods, is eliminated. Capital equipment costs associated with recycling the large quantities of $H_2SO_4$ are lower. Additionally, use of the controlled potential minimizes side reactions which may occur at the anode and cathode, and an aqueous $HNO_3$ solution having a water content of up to about 12% water can be employed to yield the anhydrous $HNO_3$.

BRIEF DESCRIPTION OF THE DRAWINGS

The accompanying drawings, which are incorporated and form a part of the Specification, illustrate various embodiments of the invention, and, together with the Description, serve to explain the principles of the invention.

DESCRIPTION OF THE INVENTION

Aqueous $HNO_3$ is utilized in the oxidation of $N_2O_4$ to $N_2O_5$, resulting in the formation of anhydrous $HNO_3$. The overall cell reactions are represented as follows:

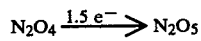

$$N_2O_4 \xrightarrow{1.5\ e^-} N_2O_5 \quad (2)$$

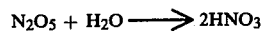

$$N_2O_5 + H_2O \longrightarrow 2HNO_3 \quad (3)$$

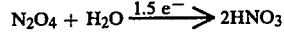

$$N_2O_4 + H_2O \xrightarrow{1.5\ e^-} 2HNO_3 \quad (4)$$

Figure 1:
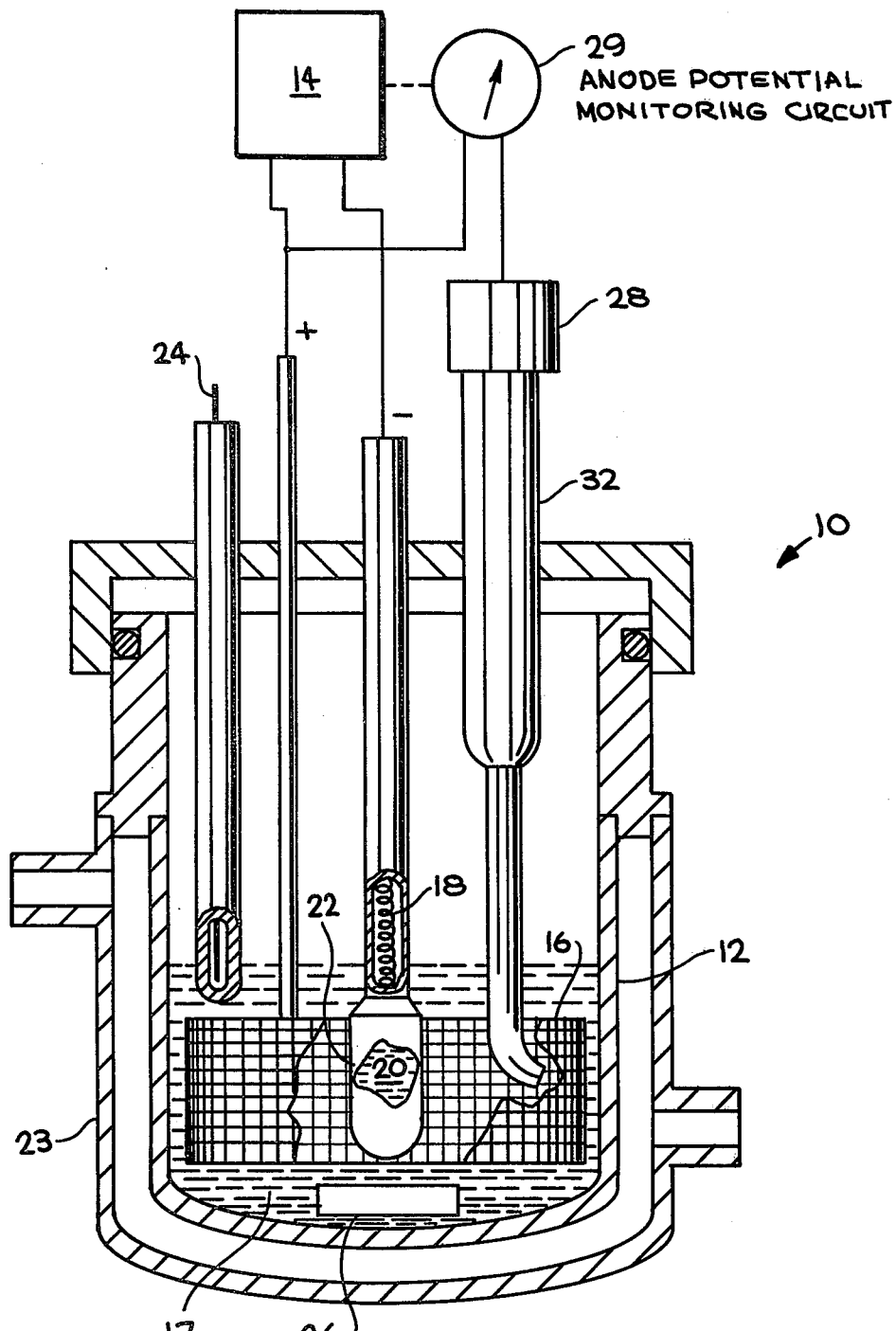
FIG. 1 illustrates schematically one embodiment of an electrochemical cell useful in the synthesis of anhydrous $HNO_3$ from aqueous $HNO_3$.

Referring now to FIG. 1, one embodiment of an electrochemical cell useful in the electrosynthesis of anhydrous $HNO_3$ is illustrated. Electrochemical cell 10 includes housing means 12 for containing a solution of $N_2O_4$ and aqueous $HNO_3$. A power source 14 is operatively connected to an anode 16 disposed within an anode compartment 17 of the electrochemical cell. The anode is partially disposed within and operatively connected to the $N_2O_4$/aqueous $HNO_3$ solution. A cathode 18 is disposed in a cathode compartment 20 of the housing means, and operatively connected to power source 14. Disposed within cathode compartment 20 is a solution of either aqueous or anhydrous $HNO_3$. The two compartments are separated by a semi-permeable membrane 22 which is porous to ions found in the solutions disposed in anode compartment 17 and cathode compartment 20, but which precludes the flow of solution between the two compartments. Membrane 22 is preferably formed from an acid-resistant material, and more preferably is a pre-fluorinated ion exchange membrane.

Means 23 are included for maintaining electrochemical cell 10 at a desired temperature. Such means include, but are not limited to, cooling jacket 23 disposed in adjacent, surrounding relationship to housing means 12, and adapted to receive a cooling medium such as water. A thermocouple 24 is disposed within housing means 12 and operatively connected to the means for maintaining the cell at the desired temperature. Optionally disposed within housing means 12 is a magnetic stirring bar 26.

Means are included for maintaining a controlled potential between anode 16 and the $N_2O_4$/aqueous $HNO_3$ solution disposed within anode compartment 17. More particularly, the potential between anode 16 and the $N_2O_4$/aqueous $HNO_3$ layer positioned adjacent to the anode is controlled. In one embodiment of the invention, the means for maintaining the controlled potential include a reference electrode 28 operatively connected to an anode potential monitoring circuit 29. Suitable reference electrodes include a saturated calomel electrode (SCE), Ag/AgCl, and Ag/Ag$_2$SO$_4$ electrodes. Reference electrode 28 is operatively connected to the $N_2O_4$/aqueous $HNO_3$ solution in cell 10 via a salt bridge 32 filled with a solution of either aqueous or anhydrous $HNO_3$.

In a second embodiment of the invention, the concentrations of the reactions, specifically $N_2O_4$, are monitored and controlled in order to control the potential between anode 16 and the $N_2O_4$/aqueous $HNO_3$ solution layer positioned adjacent to the anode.

Figure 2:
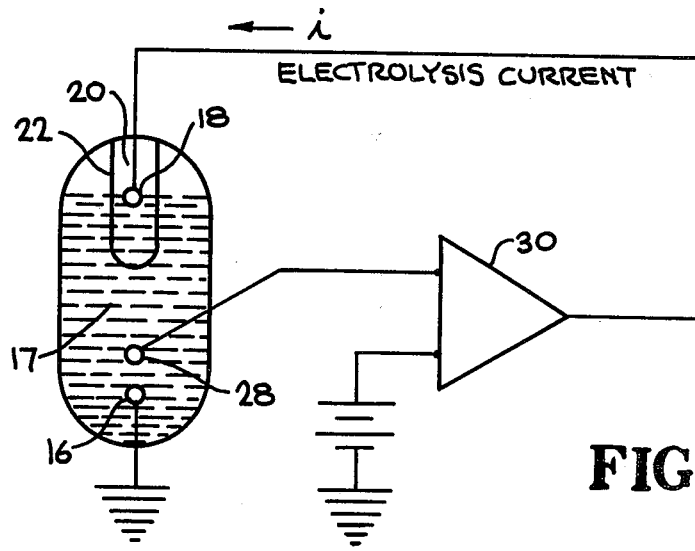
FIG. 2 illustrates schematically one embodiment of a controlled potential electrolysis system useful in the electrochemical cell illustrated in FIG. 1.

Referring now to the schematic diagram of FIG. 2, a controlled potential electrolysis system is illustrated. A potentiostat 30 is operatively connected to anode 16 and cathode 18, as well as the solutions disposed in anode compartment 17 and cathode compartment 20. Potentiostat 30 essentially includes and combines the power source and anode potential monitoring circuit of FIG. 1. Membrane 22 is positioned within cell 10 to separate the solutions housed respectively in the anode and cathode compartments. Anode 16 is grounded. Cathode 18 is connected to the low impedance output of potentiostat 30. Reference electrode 28 is connected to the high input impedance of potentiostat 30. The potential between anode 16 and reference electrode 28 is controlled, e.g., a predetermined potential is maintained and changed as desired. Electrolysis current flows between anode 16 and cathode 18, effecting the desired electrochemical reaction at anode 16. Reference electrode 28 is positioned nearly adjacent to anode 16, with the distance preferably minimized. The potential between anode 16 and the $N_2O_4$/aqueous $HNO_3$ solution within cell 10 is measured by reference electrode 28. As used throughout its disclosure, this potential difference shall be presumed to be measured against the saturated calomel reference electrode (SCE). This is not intended to limit the scope of the invention to the use of a saturated calomel reference electrode, but merely as a method of describing potential difference.

The potential of reference electrode 28 is an accurately known value on a standard scale. Reference electrode 28 serves as a voltage sensor, measuring the potential of the $N_2O_4$/aqueous $HNO_3$ solution, more particularly, the voltage between anode 16 and the $N_2O_4$/aqueous $HNO_3$ solution layer positioned adjacent to the anode. The potential difference between the solution and anode 16, which determines the nature of the electrochemical reaction, is thus accurately known. A feedback control action of potentiostat 30 maintains the desired potential difference as the electrolysis conditions fluctuate, by adjusting the voltage applied to cathode 18.

For purposes of the present invention, a controlled potential, e.g. the potential between the anode and the $N_2O_4$/aqueous $HNO_3$ solution, is preferably about 1.35 to 2.00 V vs. SCE. More preferably, the controlled potential is about 1.50 to 1.90 V vs. SCE. Most preferably, the controlled potential is about 1.80 V vs. SCE, corresponding to a current density of about 100 $mA/cm^2$.

Referring once again to FIG. 1, anode 16 and cathode 18 are each formed of a conductive material. Exemplary materials include Pt, $RuO_x$ on Ti, and $IrO_x$ on Ti, wherein x is selected from 1 or 2. The working surface area of the cathode and anode can vary; however, the preferred ratio of area of anode to anode-compartment solution volume is about 1–3 $cm^2$ per ml. Depending upon the amount of anhydrous $HNO_3$ desired, the solution capability of electrochemical cell 10 can vary.

The method of producing anhydrous $HNO_3$ from aqueous $HNO_3$ includes providing an electrochemical cell such as cell 10 illustrated in FIG. 1, which includes an anode and cathode operatively connected to a power source. Thereafter, a solution of $N_2O_4$ and aqueous $HNO_3$ is disposed within the cell, and a controlled potential is applied and maintained between the solution and the anode. The result is the formation of anhydrous $HNO_3$ within anode compartment 17. For the process, it has been discovered that cell 10 should preferably be maintained at a temperature of about 5°–20° C. More preferably, the temperature should be about 5°–16° C.

For dehydrating aqueous $HNO_3$, it has been discovered that the aqueous $HNO_3$ disposed within cathode compartment 20, anode compartment 17, and salt bridge 32 has a water content of no more than about 12% by wt. Additionally, the percentage of $N_2O_4$ in aqueous $HNO_3$ disposed within anode compartment 17 is preferably about 5–33%, and more preferably about 10–15%.

The following Examples are meant to exemplify certain embodiments of the present invention, and are not regarded as limiting its scope which is defined in the appended claims.

EXAMPLE I

Aqueous $HNO_3$ was dehydrated utilizing the electrochemical cell illustrated in FIG. 1.

57.3 grams of a 35.7% solution of $N_2O_4$ in reagent grade 90% white fuming nitric acid (11.6% $H_2O$ by analysis) was placed in the anode compartment of the cell. 90% $HNO_3$ was placed in the cathode compartment of the cell. Platinum electrodes were employed.

Electrochemical data are shown in Table I.

TABLE I

| Elapsed Time | Control Potential (+V vs SCE) | Cell Current (A) | Cell Voltage (V) | Cell Power (W) | Cell Charge Passed (C) | Cell Temp. (°C.) |
|---|---|---|---|---|---|---|
| 15 min. | 1.565 | 0.40 | 12.5 | 5.0 | 560 | 8.7 |
| 2 h | 1.675 | 0.40 | 14.2 | 5.7 | 2640 | 6.6 |
| 5 h | 1.69 | 0.47 | 40.0 | 18.8 | 7670 | 12.3 |
| 24 h | 1.735 | 0.435 | 67.0 | 29.0 | 14,350 | 15.5 |
| 28 h | 1.75 | 0.27 | 83.0 | 22.0 | 20,700 | 14.0 |

TABLE I-continued

| Elapsed Time | Control Potential (+V vs SCE) | Cell Current (A) | Cell Voltage (V) | Cell Power (W) | Cell Charge Passed (C) | Cell Temp. (°C.) |
|---|---|---|---|---|---|---|
| 47 h | 1.85 | 0.40 | 20.0 | 8.0 | 32,484 | 5.0 |
| 48 h | 1.85 | 0.23 | 10.5 | 2.4 | 34,100 | 4.2 |
| 49 h | 1.85 | 0.069 | 2.4 | 0.2 | 34,800 | 5.6 |
| 50 h | 1.85 | 0.007 | 1.1 | 0.01 | 34,900 | 5.7 |

The temperature of the cell was not permitted to exceed 16° C. At the end of the electrolysis, the anode solution was analyzed by NMR and found to contain 13.44 wt % $N_2O_5$ and 0 wt % $H_2O$. This solution could then be converted to pure, anhydrous $HNO_3$ by titration with aqueous $HNO_3$ [see Eq. (3) herein]. The excess $N_2O_5$ in the electrolyzed solution would react with the $H_2O$ in the aqueous acid to form $HNO_3$.

EXAMPLE II

Aqueous $HNO_3$ is dehydrated utilizing the same procedure as outlined in Example I above, except the electrodes are $IrO_x$ on titanium, wherein x is selected from one or two.

EXAMPLE III

Aqueous $HNO_3$ having a water content of less than about 12% is dehydrated utilizing the method disclosed in Example I above, except substituting for the platinum electrodes, $RuO_x$ on titanium electrodes, wherein x is selected from one or two.

The foregoing description of a preferred embodiment of the invention has been presented for purposes of illustration and description. It is not intended to be exhaustive or to limit the invention to the form disclosed, and obviously many modifications and variations are possible in light of the above teachings. The embodiments were chosen and described in order to best explain the principles of the invention in its practical application, to thereby enable others skilled in the art to best utilize the invention in various embodiments, and with various modifications as are suited to the particular use contemplated. It is intended that the scope of the invention be defined by the claims appended hereto.

We claim:

1. A method of dehydrating aqueous $HNO_3$, comprising:
   providing an electrochemical cell including an anode disposed in an anode compartment of said cell, and a cathode disposed in a cathode compartment, said anode and cathode being operatively connected to a power source;
   disposing a solution of $N_2O_4$ and aqueous $HNO_3$ in said anode compartment;
   applying and maintaining a controlled potential of about 1.35 to 2.00 V vs SCE between said $N_2O_4$/aqueous $HNO_3$ solution and said anode; and
   forming $N_2O_5$ in anhydrous $HNO_3$ within said anode compartment.

2. The method of dehydrating aqueous $HNO_3$ according to claim 1, wherein said controlled potential is about 1.80 V vs. SCE.

3. The method of dehydrating aqueous $HNO_3$ according to claim 1, further comprising maintaining said cell at a temperature of about 5°–20° C.

4. The method of dehydrating aqueous $HNO_3$ according to claim 1, further comprising maintaining said cell at a temperature of about 5°–16° C.

5. The method of dehydrating aqueous $HNO_3$ according to claim 1, wherein a solution of aqueous $HNO_3$ is disposed in said cathode compartment.

6. The method of dehydrating aqueous $HNO_3$ according to claim 1, wherein said $N_2O_4$/aqueous $HNO_3$ solution disposed in said anode compartment has a water content of no more than about 12% by weight.

7. The method of dehydrating aqueous $HNO_3$ according to claim 5, wherein said aqueous $HNO_3$ solution disposed in said cathode compartment has a water content of no more than about 12% by weight.

8. The method of dehydrating aqueous $HNO_3$ according to claim 6, wherein the percentage of $N_2O_4$ in aqueous $HNO_3$ disposed in said anode compartment is about 5–33.

9. The method of dehydrating aqueous $HNO_3$ according to claim 6, wherein the percentage of $N_2O_4$ in aqueous $HNO_3$ disposed in said anode compartment is about 10–15.

10. An apparatus for electrochemically synthesizing anhydrous $HNO_3$ from a solution of aqueous $HNO_3$, comprising:
    means for housing a solution of $N_2O_4$ and a solution of aqueous $HNO_3$;
    a power source;
    an anode disposed in an anode compartment of said housing means, said anode being operatively connected to said $N_2O_4$ and aqueous $HNO_3$ solutions and to said power source;
    a cathode disposed in a cathode compartment of said housing means and operatively connected to said power source, said cathode compartment housing a solution of aqueous $HNO_3$; and
    means for maintaining a controlled potential between said $N_2O_4$ and aqueous $HNO_3$ solution disposed in said anode compartment and said anode.

11. The apparatus for electrochemically synthesizing anhydrous $HNO_3$ according to claim 10, further comprising an acid-resistant membrane separating said $N_2O_4$/aqueous $HNO_3$ solution disposed in said anode compartment from said aqueous $HNO_3$ solution disposed in said cathode compartment, said membrane permitting the flow of ions therethrough.

12. The apparatus for electrochemically synthesizing anhydrous $HNO_3$ according to claim 10, further comprising means for maintaining said anode and cathode compartments at a temperature of about 5°–16° C.

13. The apparatus for electrochemically synthesizing anhydrous $HNO_3$ according to claim 12, wherein said means for maintaining said anode and cathode compartments at a temperature of about 5°–16° C. comprises a cooling jacket disposed in adjacent surrounding relationship to said housing means, and adapted to receive a cooling medium.

14. The apparatus for electrochemically synthesizing anhydrous $HNO_3$ according to claim 10, wherein said means for maintaining a controlled potential comprises a potentiostat operatively connected to said anode and cathode.

15. The apparatus for electrochemically synthesizing anhydrous $HNO_3$ according to claim 10, wherein each of said anode and cathode comprises an electrode formed from a material selected from platinum, $RuO_x$, and $IrO_x$, wherein x is 1 or 2.

* * * * *